United States Patent
Mitani et al.

(10) Patent No.: US 11,881,738 B2
(45) Date of Patent: Jan. 23, 2024

(54) BACKUP POWER SUPPLY SYSTEM AND VEHICLE

(71) Applicant: Panasonic Intellectual Property Management Co., Ltd., Osaka (JP)

(72) Inventors: Yohsuke Mitani, Osaka (JP); Takeshi Umeda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 175 days.

(21) Appl. No.: 17/629,365

(22) PCT Filed: Jul. 28, 2020

(86) PCT No.: PCT/JP2020/028775
§ 371 (c)(1),
(2) Date: Jan. 21, 2022

(87) PCT Pub. No.: WO2021/020357
PCT Pub. Date: Feb. 4, 2021

(65) Prior Publication Data
US 2022/0255343 A1    Aug. 11, 2022

(30) Foreign Application Priority Data

Jul. 29, 2019   (JP) .................................. 2019-139205

(51) Int. Cl.
*H02J 9/06* (2006.01)
*H02J 7/00* (2006.01)
(Continued)

(52) U.S. Cl.
CPC .............. *H02J 9/06* (2013.01); *B60R 16/033* (2013.01); *H02J 7/0031* (2013.01); *H02J 7/0063* (2013.01); *H02J 9/002* (2013.01)

(58) Field of Classification Search
CPC .... H02J 9/06; H02J 7/00; H02J 7/0031; H02J 7/0063; H02J 9/00; H02J 9/002; B60R 16/033
See application file for complete search history.

(56) References Cited

U.S. PATENT DOCUMENTS

| | | |
|---|---|---|
| 2008/0173121 A1 | 7/2008 | Kimura et al. |
| 2011/0148360 A1 | 6/2011 | Lee |
| 2019/0232902 A1 | 8/2019 | Teng |

FOREIGN PATENT DOCUMENTS

| | | |
|---|---|---|
| JP | 2008-180250 | 8/2008 |
| JP | 2009-077570 | 4/2009 |

(Continued)

OTHER PUBLICATIONS

International Search Report of PCT application No. PCT/JP2020/028775 dated Oct. 20, 2020.

*Primary Examiner* — Robert L Deberadinis
(74) *Attorney, Agent, or Firm* — Rimon P.C.

(57) ABSTRACT

A backup power-supply system according to the present invention includes a detector, a power storage unit, and a controller. The detector is configured to detect an abnormality of a power supply that supplies electric power to loads. The power storage unit is configured to supply electric power to the loads when the detector detects the abnormality of the power supply. The controller is configured to monitor a remaining electric energy remaining in the power storage unit, and impose, when the remaining electric energy of the power storage unit is smaller than a threshold electric energy, a limitation on the loads to which the power storage unit supplies the electric power.

14 Claims, 4 Drawing Sheets

(51) Int. Cl.
*H02J 9/00* (2006.01)
*B60R 16/033* (2006.01)

(56) References Cited

FOREIGN PATENT DOCUMENTS

| | | |
|---|---|---|
| JP | 2011-135763 | 7/2011 |
| JP | 2016-163422 | 9/2016 |
| JP | 2017-028772 | 2/2017 |
| JP | 2017-216789 | 12/2017 |
| WO | 2018/061750 | 4/2018 |

BACKUP POWER SUPPLY SYSTEM AND VEHICLE

TECHNICAL FIELD

The present disclosure relates to a backup power-supply system and a vehicle, and particularly to a backup power-supply system including a power storage unit for back up for a power supply that supplies electric power to plural loads and to a vehicle equipped with the backup power-supply system.

BACKGROUND ART

PTL 1 discloses a backup device for a vehicle that is intended to back up plural drive sources by supplying electric power from a secondary power supply unit (power storage unit) when supplying electric power from a primary power supply unit (power supply) is interrupted. In the backup device, when detecting an abnormal condition of the supplying of electric power from the primary power supply unit, a controller instructs a discharging unit to cause a discharge current from the secondary power supply unit to flow, intermittently multiple times, to each of the drive sources. Moreover, the controller controls, via the instructions, supply destinations of the discharge current that flows from the secondary power supply unit to the plural drive sources as follows: Time to instruct the discharging unit to cause the discharge current to flow to each drive source is shifted from times to instruct the discharging unit to flow the discharge current to another drive source out of the plural drive sources. That is, the electric power from the secondary power supply unit is supplied to the plural drive sources by time-sharing processing. This configuration avoids concentration of the discharge current that otherwise flow to the plural drive sources at the same time.

CITATION LIST

Patent Literature

PTL 1: International Publication WO 2018/061750

SUMMARY

In the backup device (backup power-supply system) disclosed in PTL1, electric power from the secondary power supply unit is supplied to the plural drive sources (loads) by time-sharing processing. In this supplying, however, the electric power may not be supplied to an important drive source (load) when a remaining electric energy remaining in the second power supply unit becomes small.

The present disclosure is made in view of the aforementioned problem and an object thereof is to provide a backup power-supply system configured to supply electric power preferentially to an important load even when a remaining electric energy of a power storage unit becomes small, and to provide a vehicle having the backup power-supply system mounted thereon.

A backup power-supply system according to one aspect of the present disclosure includes a detector, a power storage unit, and a controller. The detector is configured to detect an abnormality of a power supply that supplies electric power to plural loads. The power storage unit is configured to supply electric power to the plural loads when the detector detects the abnormality of the power supply. The controller is configured to monitor a remaining electric energy remaining in the power storage unit, and to impose a limitation on the plural loads to which the power storage unit supplies the electric power when the remaining electric energy of the power storage unit is smaller than a threshold electric energy.

A vehicle according to one aspect of the present disclosure includes the backup power-supply system according to the one aspect described above and a vehicle body having the backup power-supply system mounted thereon.

The present disclosure provides an advantageous effect that electric power is supplied preferentially to an important load even when the remaining electric energy of the power storage unit becomes small.

DESCRIPTION OF EMBODIMENTS

Exemplary Embodiment

Note that the embodiment and modified examples described below are each merely one example of the present disclosure; therefore, the present disclosure is not limited to any of the embodiment and modified examples described below. Various modifications other than the embodiment and modified examples described below may be made according to a design concept or the like without departing from the scope of technical ideas of the present disclosure.

Outline

Backup power-supply system 1 according to an exemplary embodiment will be described with reference to FIG. 2. When main power supply 4 is in an abnormal condition, backup power-supply system 1 in place of main power supply 4 supplies electric power to plural electric apparatuses 5 (loads). This configuration allows the electric apparatuses 5 to continuously operate with the electric power supplied from backup power-supply system 1 even in the case where electric power from main power supply 4 stops.

Figure 1:
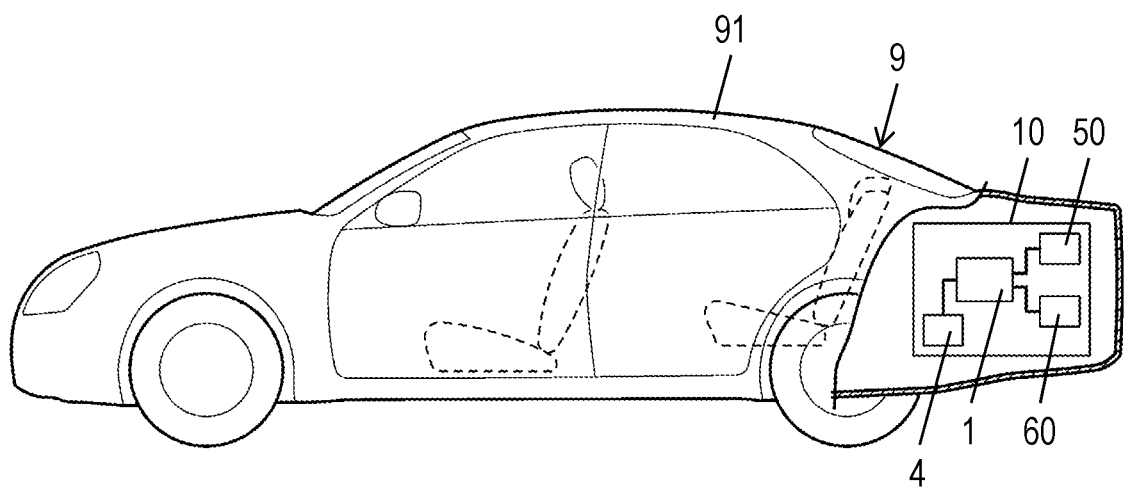
FIG. 1 is a partially cut-away side view of a vehicle having a backup power-supply system mounted thereon according to an exemplary embodiment.

Backup power-supply system 1 is mounted on vehicle 9 (a movable body configured to run with wheels, e.g., a four-wheeled vehicle) (FIG. 1). Vehicle 9 includes drive system 10 and vehicle body 91 (the body of the vehicle) on which drive system 10 is mounted. Drive system 10 includes backup power-supply system 1, main power supply 4, and the plural electric apparatuses 5. Main power supply 4 is a battery (e.g., a lead storage battery) mounted on the vehicle and is configured to supply electric power to the electric apparatuses 5.

The electric apparatuses 5 in accordance with the embodiment are two electric apparatuses, i.e., shift-by-wire system 50 and brake system 60. In the embodiment, the electric apparatuses 5 are two electric apparatuses of shift-by-wire system 50 and brake system 60; however, the number of electric apparatuses 5 may be three or more.

Shift-by-wire system 50 is a system to shift, by electrically powered operations, a shift range of an automatic transmission mounted on a vehicle. Shift-by-wire system 50 includes drive controller 51 and actuator 52. Drive controller 51 controls the drive of actuator 52 by outputting a control signal to actuator 52 in accordance with the position of a shift lever which a driver manipulates. Actuator 52 is configured to shift the shift range of automatic transmission 6 in accordance with the control signal fed from drive controller 51.

The shift range of the automatic transmission includes a parking range (P range), a reverse range (R range), a neutral range (N range), and a drive range (D range). The drive range is selected to cause the vehicle to travel forward. The reverse range is selected to cause the vehicle to travel backward. The parking range is selected during parking of the vehicle. In the parking range, actuator 52 locks a rotary shaft inside the automatic transmission, thereby locking the movement of the vehicle.

Brake system 60 configured to electrically drive a brake mechanism disposed on each wheels of the vehicle. Brake system 60 includes drive controller 61 and actuator 62. Drive controller 61 controls the drive of actuator 62 by outputting a control signal to actuator 62 in accordance with the amount of a driver's manipulation of a brake pedal. Actuator 62 is configured to cause the brake mechanism disposed on each wheel to operate in accordance with the control signal supplied from drive controller 61, thereby brakes all wheels.

Shift-by-wire system 50 and brake system 60 are configured to operate by the electric power supplied from either main power supply 4 or backup power-supply system 1.

When main power supply 4 is in normal conditions, main power supply 4 supplies electric power to plural electric apparatuses 5 (i.e., each of systems 50 and 60). On the other hand, when main power supply 4 is in abnormal conditions, backup power-supply system 1 supplies electric power to plural electric apparatuses 5. For this reason, even if main power supply 4 is in abnormal conditions, electric apparatuses 5 operate in response to user's manipulations. Such abnormal conditions of main power supply 4 are, for example, that the output voltage of main power supply 4 drops down to lower than a predetermined voltage value (that is, falls into a power supply failure) due to failure, degradation, or the like of main power supply 4.

Moreover, in the embodiment, when a remaining electric energy remaining in backup power-supply system 1 becomes small, electric apparatuses out of electric apparatuses 5 receiving the electric power are limited. That is, the electric power is supplied only to particular electric apparatuses 5 (particular loads) out of the electric apparatuses 5 and electric power supplied to the other electric apparatuses 5 (non-particular loads) is stopped. In this configuration, the electric power is preferentially supplied to important electric apparatuses (i.e., particular electric apparatuses) 5, thereby ensuring the operations of important electric apparatuses 5.

Configuration

Figure 2:
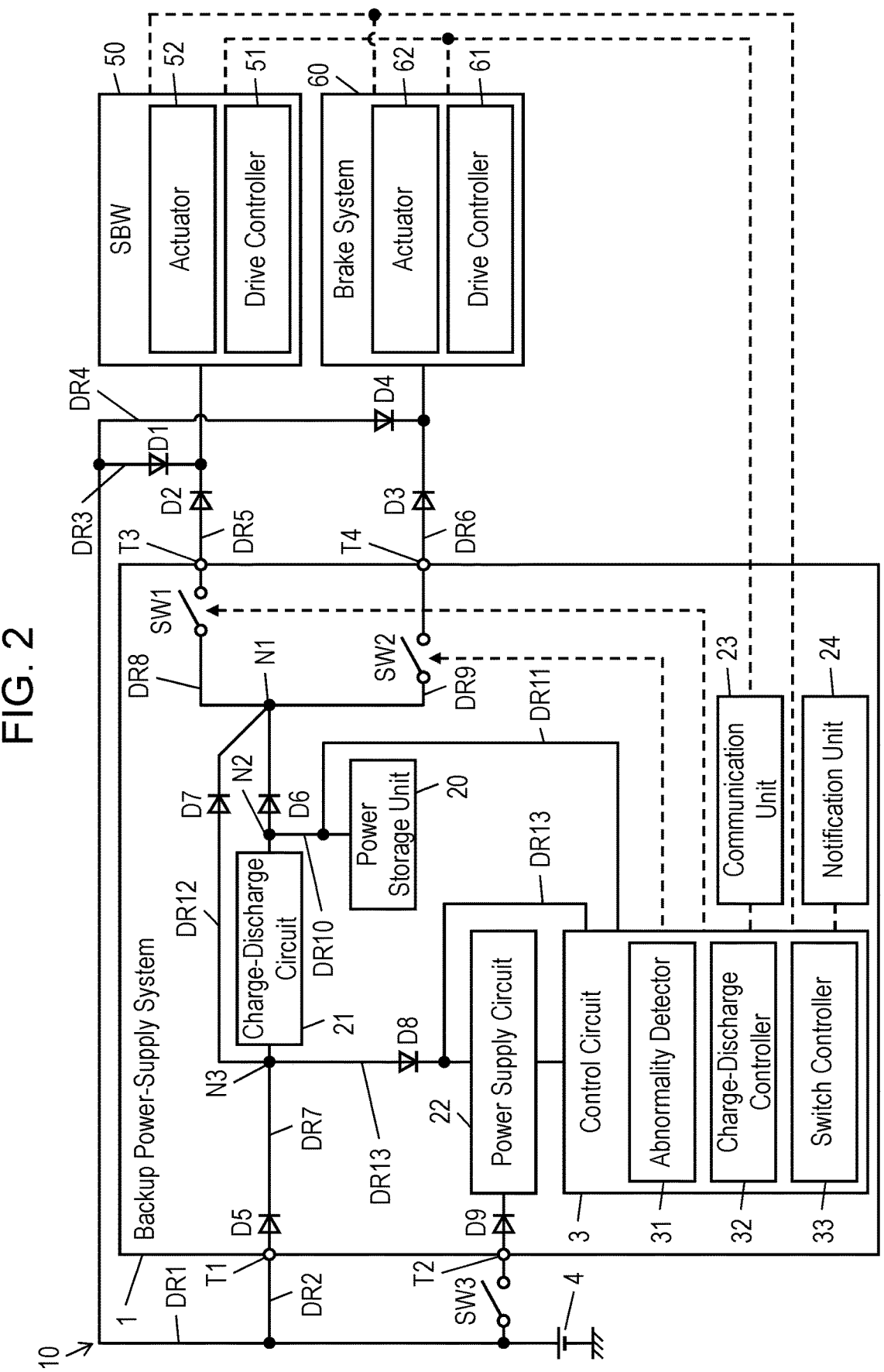
FIG. 2 is a block diagram of the backup power-supply system according to the embodiment.

As shown in FIG. 2, backup power-supply system 1 according to the embodiment includes power storage unit 20, charge-discharge circuit 21 (transformation circuit), power supply circuit 22, control circuit 3, plural switches SW1 and SW2, diodes D5 to D9, communication unit 23, plural (e.g., two) input terminals T1 and T2, plural (e.g., two) output terminals T4 and T5, and conductive paths DR7 to DR13.

Main conductive path DR1 is connected to main power supply 4. Plural branch conductive paths DR2 to DR4 are connected to main conductive path DR1. Electric power supplied from main power supply 4 is supplied to backup power-supply system 1 and electric apparatuses 5 via main conductive path DR1 and branch conductive paths DR2 to DR4.

Input terminal T1 is coupled to main conductive path DR1 (therefore, main power supply 4) via branch conductive path DR2, thereby receiving the electric power from main power supply 4. Input terminal T2 is coupled to main conductive path DR1 via ignition switch SW3, thereby receiving an ON-signal and an OFF-signal from ignition switch SW3. Output terminal T3 is coupled to branch conductive path DR3 via conductive path DR5, thereby outputting electric power to shift-by-wire system 50. Output terminal T4 is coupled to branch path DR4 via conductive path DR6, thereby outputting electric power to brake system 60.

Diodes D1 and D2 are provided in branch path DR3 and conductive path DR5, respectively. Cathodes of diodes D1 and D2 are connected to each other and coupled to shift-by-wire system 50. Diodes D1 and D2 output electric power from one output terminal T3 and branch path DR3 with a higher voltage to shift-by-wire system 50. That is, when the voltage of output terminal T3 is higher than the other, diode D2 is conductive while diode D1 is not conductive, which causes the electric power supplied from output terminal T3 to output to shift-by-wire system 50 via diode D2. When the voltage of branch path DR3 is higher than the other, diode D1 is conductive while diode D2 is not conductive, which causes the electric power supplied from branch path DR3 to be output to shift-by-wire system 50 via diode D1.

In the case where main power supply 4 is not in abnormal conditions, switch SW1 is turned off as described later. Thus, since branch path DR3 is higher in voltage than output terminal T3, diode D1 is conductive while diode D2 is not conductive. As a result, electric power supplied from branch path DR3 (i.e., main power supply 4) is output to shift-by-wire system 50. In this case, since switch SW1 is turned off, output terminal T3 (i.e., power storage unit 20) is electrically disconnected from shift-by-wire system 50. On the other hand, in the case where main power supply 4 is in abnormal conditions, switch SW1 is turned on as described later. Thus, since output terminal T3 has a higher voltage than branch path DR3, diode D1 is not conductive while diode D2 is conductive. As a result, electric power supplied from output terminal T3 (i.e., power storage unit 20) is output to shift-by-wire system 50. In this case, since diode D1 is not conductive, main power supply 4 is electrically disconnected from shift-by-wire system 50.

Diodes D3 and D4 are provided in conductive path DR6 and branch path DR4, respectively. Cathodes of diodes D3 and D4 are connected to each other and coupled to brake system 60. Diodes D3 and D4 allow electric power supplied from one of output terminal T4 and branch path DR4 with a higher voltage to be output to brake system 60.

Note that, in the case where main power supply 4 is not in abnormal conditions, switch SW2 is turned off as described later. Thus, since branch path DR4 has a higher voltage than output terminal T4, diode D4 is conductive while diode D3 is not conductive. As a result, electric power supplied from branch path DR4 (i.e., main power supply 4) is output to brake system 60. In this case, since switch SW2 is turned off, output terminal T4 (i.e., power storage unit 20) is electrically disconnected from brake system 60. On the other hand, in the case where main power supply 4 is in abnormal conditions, switch SW2 is turned on as described later. Thus, since output terminal T4 has a higher voltage than branch path DR4, diode D3 is conductive while diode D4 is not conductive. As a result, electric power supplied from output terminal T4 (i.e., power storage unit 20) is output to brake system 60. In this case, since diode D4 is not conductive, main power supply 4 is electrically disconnected from brake system 60.

Conductive paths DR7 to DR9 are coupled between input terminal T1 and two output terminals T3 and T4. One end of conductive path DR7 is coupled to input terminal T1, and another end (node N1) of conductive path DR7 is coupled to respective one ends of plural (e.g., two) conductive paths DR8 and DR9. One end of each of conductive paths DR8 and DR9 is coupled to another end of conductive path DR7, and another end of each of conductive paths DR8 and DR9 is coupled to output terminals T3 and T4, respectively.

Diode D5, charging-discharging circuit 21, and diode D6 are provided in conductive path DR7 in this order from the input terminal T1 toward the node N1. Cathodes of diodes D6 and D7 are directed toward the node N1, and an anode of diode D5 is directed toward the input terminal T1.

Power storage unit 20 is coupled to conductive path DR7 and coupled through conductive path DR10 to node N2 where charging-discharging circuit 21 is connected to diode D6. An input-output end of power storage unit 20 is coupled to control circuit 3 via conductive path DR11, so that the output voltage of power storage unit 20 is supplied to control circuit 3 via conductive path DR11. The cathode of diode D5 is coupled to charging-discharging circuit 21, and the anode of diode D5 is coupled to input terminal T1. Conductive path DR12 is coupled between two nodes N1 and N3. Node N3 is a node where diode D5 is connected to charging-discharging circuit 21. Diode D7 is disposed in conductive path DR12. A cathode of diode D7 is coupled to node N1, and an anode of diode D7 is coupled to node N3.

Node N3 of conductive path DR7 is coupled to control circuit 3 via conductive path DR13. Diode D8 and power supply circuit 22 are disposed in conductive path DR13 in this order from node N3 toward control circuit 3. A cathode of diode D8 is coupled to power supply circuit 22, and an anode of diode D8 is coupled to node N3. An input end of power supply circuit 22 is coupled to control circuit 3 via conductive path DR13, and an input voltage (i.e., the output voltage of main power supply 4) of power supply circuit 22 is supplied to control circuit 3. Diode D9 is coupled between input terminal T2 and power supply circuit 22. A cathode of diode D9 is coupled to power supply circuit 22, and an anode of diode D9 is coupled to input terminal T2. This configuration allows either the ON signal or the OFF signal from ignition switch SW3 to be supplied to power supply circuit 22 via diode D9. Switches SW1 and SW2 are provided in two conductive paths DR8 and DR9, respectively.

Power storage unit 20 is a power supply for backup (i.e., an auxiliary or spare) of main power supply 4. Power storage unit 20 is implemented by, for example, an electrical double-layer capacitor (EDLC). Note that power storage unit 20 may be implemented by a secondary battery, such as, a lithium-ion capacitor (LIC) or a lithium-ion battery (LIB). Note that the lithium-ion capacitor includes a positive electrode made of the same material (e.g., activated carbon) as that of the EDLC, and includes a negative electrode made of the same material (e.g., carbon material such as graphite) as that of the LIB.

Power storage unit 20 is not necessarily implemented by the electrical double-layer capacitor, and may be, for example, an electrochemical device with the configuration described below. The electrochemical device referred to herein includes a positive electrode, a negative electrode, and a non-aqueous electrolytic solution. The positive electrode includes a positive current collector, and a positive electrode material layer supported by the positive current collector. The positive electrode material layer contains positive electrode active material. The positive electrode material layer contains a conductive polymer as a positive electrode active material for doping and dedoping anions (dopants). The negative electrode includes a negative electrode material layer that contains a negative electrode active material. The negative electrode active material is, for example, a material that undergoes a redox reaction accompanied by occlusion and release of lithium ions, and is specifically a carbon material, a metal compound, an alloy, a ceramic material, or the like. The non-aqueous electrolytic solution has, as one example, conductivity to lithium-ion. The non-aqueous electrolytic solution of this type contains a lithium salt and a non-aqueous solution that dissolves the lithium salt. An electrochemical device having such a configuration exhibits higher energy density than electrical double-layer capacitors and the like.

Power storage unit 20 may be configured with not less than two power storage devices (e.g., electrical double-layer capacitors or the like) that are electrically connected in parallel, in series, or in series and parallel. That is, one power storage unit 20 may be implemented by a parallel or series circuit of at least two power storage devices, or a combination thereof.

Charging-discharging circuit 21 is configured to charge and discharge power storage unit 20 under the control exerted by control circuit 3. Charging-discharging circuit 21 is, for example, a bidirectional boost-up/step-down circuit. When functioning as a charging circuit, charging-discharging circuit 21 receives an input voltage from the node N3, lowers the input voltage, and outputs the resulting voltage toward the node N2. When functioning as a discharging circuit, charging-discharging circuit 21 receives an input voltage from the node N2, raises the input voltage, and outputs the resulting voltage toward the node N3.

When charging power storage unit 20, charging-discharging circuit 21 functions as a charging circuit. In this case, charging-discharging circuit 21 receives the output voltage of main power supply 4 via diode D5 with the output voltage supplied to input terminal T1, lowers the thus-received voltage, and outputs the resulting voltage to power storage unit 20. This configuration allows the output electric power of main power supply 4 to charge power storage unit 20.

When discharging power storage unit 20 (i.e., when main power supply 4 is in abnormal conditions), charging-discharging circuit 21 functions as a discharging circuit. In this case, charging-discharging circuit 21 raises the output voltage of power storage unit 20 and outputs (i.e., discharges) the resulting voltage to node N3. This configuration allows the output electric power of power storage unit 20 to be output to node N1 via both charging-discharging circuit 21 and diode D7. Until charging-discharging circuit 21 raises the output voltage of power storage unit 20 (that is, while the discharge voltage of charging-discharging circuit 21 is lower than the output voltage of power storage unit 20), diode D6 is conductive and diode D7 is not conductive. Therefore, during this while, the output voltage of power storage unit 20 is output to node N1 via diode D6. Then, when charging-discharging circuit 21 raises the output voltage of power storage unit 20, diode D7 is conductive and diode D6 is not conductive. This configuration allows the output voltage of power storage unit 20 to be output to node N1 via both charging-discharging circuit 21 and diode D7. The voltage output to node N1 is then output both from output terminal T3 via switch SW1 and from output terminal T4 via switch SW2. This configuration allows the output electric power of power storage unit 20 to be supplied from output terminal T3 to drive controller 51 and actuator 52, which are both in shift-by-wire system 50, and is also supplied from output terminal T4 to drive controller 61 and actuator 62, which are both in brake system 60.

Backup power-supply system 1 according to the embodiment is configured to supply the electric power via the same conductive path to both drive controller 51 and actuator 52 which are both in shift-by-wire system 50; however, backup power-supply system 1 may be configured to supply the electric power via different conductive paths to the respective two. In this case, the values of the thus-supplied voltages may be different between drive controller 51 and actuator 52. The same conductive path is used to supply the electric power to both drive controller 61 and actuator 62 which are both in brake system 60; however, different conductive paths may be used to supply the electric power to the respective two. In this case, the values of the thus-supplied voltages may be different between drive controller 61 and actuator 62.

Power supply circuit 22 is configured to generate an operation voltage of control circuit 3. Power supply circuit 22 lowers the output voltage of main power supply 4 supplied via input terminal T1 and diodes D5 and D8 down equal to a predetermined voltage (e.g., 5 V), and outputs the resulting voltage to control circuit 3. In this configuration, the output electric power of main power supply 4 is supplied to control circuit 3, which allows control circuit 3 to operate. Power supply circuit 22 operates or halts in response to the ON signal and the OFF signal of ignition switch SW3 supplied via both input terminal T2 and diode D9. That is, power supply circuit 22 operates in response to the ON signal of ignition switch SW3 and halts in response to the OFF signal of ignition switch SW3.

Communication unit 23 is configured to perform communications (e.g., wired communication) with plural electric apparatuses 5. For example, communication unit 23 receives various instruction signals from electric apparatuses 5, and then outputs the thus-received instruction signals to control circuit 3. Control circuit 3 operates in response to the instruction signals supplied from electric apparatuses 5. The instruction signals described above include, for example, signals that instructs control circuit 3 to start and halt the charging-discharging of power storage unit 20. The instruction signals may be pulse width modulation (PWM) signals. That is, in this backup power-supply system 1, the instruction signals supplied from electric apparatuses 5 control the charging-discharging of power storage unit 20.

In the case that backup power-supply system 1 imposes a limitation on electric apparatuses 5 to which electric power is supplied from power storage unit 20, communication unit 23 receives a notice of the content of the limitation from control circuit 3, and then transmits the received notice to electric apparatuses 5. This configuration allows electric apparatuses 5 to receive the notice that the limitation in power supply has been imposed on electric apparatuses 5 to which the electric power is supplied from power storage unit 20.

Notification unit 24 is configured to receive a notice of the content of the limitation from control circuit 3 when backup power-supply system 1 imposes the limitation on electric apparatuses 5 to which the electric power is supplied from power storage unit 20, and then, to notify a driver (user) of the vehicle of the received notice. Notification unit 24 is, for example, an indication unit (e.g., an indicator), and is disposed, for example, in an instrument panel of the vehicle. The indication given by notification unit 24 notifies the driver of the vehicle of the limitation in power supply having been imposed on electric apparatuses 5 to which the electric power is supplied from power storage unit 20.

Plural switches SW1 and SW2 are provided in plural conductive paths DR8 and DR9, respectively, and selectively switches between the conducting and the non-conducting of conductive paths DR8 and DR9 in response to the control exerted by control circuit 3. In response to the control exerted by control circuit 3, the selective switching is performed between the outputting of and the halting of the output voltages from output terminals T3 and T4. Switches SW1 and SW2 are each implemented by a semiconductor switching element (for example, metal oxide semiconductor field effect transistor (MOSFET).

Control circuit 3 imposes the limitation on electric apparatuses 5 to which the electric power is supplied from power storage unit 20 by controlling the charging-discharging of power storage unit 20 and also controlling switches SW1 and SW2.

Control circuit 3 is a computer system (e.g., a microcontroller) that is mainly configured with a processor and a memory. Control circuit 3 implements the functions (offered by abnormality detector 31, charging-discharging controller 32, and switch controller 33 to be described later) of control circuit 3 by causing the processor to execute a program stored in the memory. The program may be provided by being pre-recorded in the memory, provided via a telecommunications line such as the Internet, or provided by being recorded in a recording medium such as a memory card. Control circuit 3 is configured to start up when beginning to receive the electric power from power supply circuit 22 upon turning-on of ignition switch SW3.

Control circuit 3 includes abnormality detector 31 (detector), charging-discharging controller 32, and switch controller 33 (control unit).

Abnormality detector 31 detects, for example, whether or not main power supply 4 is in abnormal conditions based on the output voltage of main power supply 4 supplied to control circuit 3 via conductive path DR13. For example, abnormality detector 31 determines that there is no abnormality (that is, no detection of any abnormality) when the voltage of main power supply 4 is not lower than a predetermined threshold. Then, abnormality detector 31 determines that there is an abnormality when the voltage of main power supply 4 is lower than the predetermined threshold. Thus, abnormality detector 31 is configured to detect the abnormality through this determination of the abnormality.

When abnormality detector 31 does not detect any abnormality in main power supply 4, charging-discharging controller 32 controls charging-discharging circuit 21 such that power storage unit 20 is charged as described above. When abnormality detector 31 detects an abnormality in main power supply 4, charging-discharging controller 32 controls charging-discharging circuit 21 such that power storage unit 20 discharges as described above. Power storage unit 20 is thus discharged when an abnormality in main power supply 4 is detected, thereby switching the source of the electric power supplied to electric apparatuses 5 from main power supply 4 to backup power-supply system 1 (power storage unit 20). This configuration prevents an instantaneous interruption of the electric power supplied to electric apparatuses 5.

Note that, in controlling charging-discharging circuit 21 such that power storage unit 20 is charged, charging-discharging controller 32 controls charging-discharging circuit 21 as follows: In the case where the output voltage of power storage unit 20 is lower than a first predetermined value, charging-discharging circuit 21 is controlled such that power storage unit 20 is subjected to constant-current charging. In the case where the output voltage of power storage unit 20 is not lower than the first predetermined value, charging-discharging circuit 21 is controlled such that power storage unit 20 is subjected to constant-voltage charging. Moreover, in controlling charging-discharging circuit 21 such that power storage unit 20 is discharged, charging-discharging controller 32 performs control such that charging-discharging circuit 21 raises the output voltage (discharge voltage) of power storage unit 20 up to a second predetermined value (e.g., 9V). The output voltage, at this time, of charging-discharging circuit 21 is controlled to the voltage at which the plurality of electric apparatus 5 is normally operable.

Switch controller 33 controls turning on and off switches SW1 and SW2 based on the output voltage of power storage unit 20 supplied to control circuit 3 via conductive path DR11. More specifically, switch controller 33 monitors the output voltage of power storage unit 20 by determining whether or not the output voltage of power storage unit 20 has become lower than a threshold voltage.

In the case where abnormality detector 31 does not detect any abnormality in main power supply 4, switch controller 33 turns off all the switches SW1 and SW2. This halts the outputting of the output voltage from all the output terminals T3 and T4. Further, switch controller 33 turns on all the switches SW1 and SW2 from the time when abnormality detector 31 detects an abnormality in main power supply 4 until the output voltage of power storage unit 20 is determined to become lower than the threshold voltage. This configuration causes the output electric power of power storage unit 20 to be output from output terminals T3 and T4. As a result, the output electric power of power storage unit 20 becomes available to be supplied to electric apparatuses 5 (i.e., two systems 50 and 60).

When determining that the output voltage of power storage unit 20 becomes lower than the threshold voltage, switch controller 33 turns on only a particular switch (e.g., SW1) out of switches SW1 and SW2, and turns off the other one or more switches (e.g., SW2) out of switches SW1 and SW2. This configuration allows the output electric power of power storage unit 20 is output only from output terminal T3 out of plural output terminals T3 and T4 which corresponds to particular switch SW1 and the output electric power of power storage unit 20 is not output from output terminal T4 corresponding to the other switch SW2. As a result, electric apparatuses 5 to which power storage unit 20 supplies the electric power are limited. More specifically, the output electric power of power storage unit 20 is supplied only to particular electric apparatus 5 (e.g., shift-by-wire system 50) out of plural electric apparatuses 5 (i.e., two systems 50 and 60).

That is, in this backup power-supply system 1, when the output voltage of power storage unit 20 becomes lower than the threshold voltage (in other words, the remaining electric energy of power storage unit 20 becomes smaller than a threshold electric energy, i.e., an amount of a threshold electric power corresponding to the threshold voltage), the electric apparatuses 5 to which electric power is supplied from power storage unit 20 are limited to be particular electric apparatus 5, which ensures the supplying of electric power to particular electric apparatus 5. This results in ensured operation of particular electric apparatus 5.

The particular electric apparatus 5 is one of most important electric apparatus (i.e., the electric apparatus 5 that are essentially required to supply electric power) among plural electric apparatuses 5. This configuration ensures the operation of important electric apparatus 5 even when the remaining electric energy of power storage unit 20 is smaller than the threshold electric energy.

In the embodiment, particular electric apparatus 5 is shift-by-wire system 50 out of shift-by-wire system 50 and brake system 60. The reason of this is as follows: Assuming that a driver halts the vehicle on a slope by pressing a brake pedal to apply the brakes and then finally shifts the shift lever into the parking range to lock (shift-lock) the automatic transmission, the last operation which is shift-lock is executable even if the remaining electric energy of power storage unit 20 becomes small.

In the embodiment, the threshold voltage corresponds to electric energy allowing particular electric apparatus 5 to operate at least once (e.g., once). In the case where electric apparatuses 5 to which power storage unit 20 supplies electric power are limited to particular electric apparatus 5, the supplying of electric power from power storage unit 20 to the other electric apparatuses 5 is halted. For this reason, in the embodiment, the threshold voltage is determined to be equal to the voltage (the smallest possible voltage value) that corresponds to electric energy allowing particular electric apparatus 5 to operate at least once (e.g., once). This configuration allows electric apparatuses 5 to which power storage unit 20 supplies electric power to be less prone to be limited.

Figure 3:
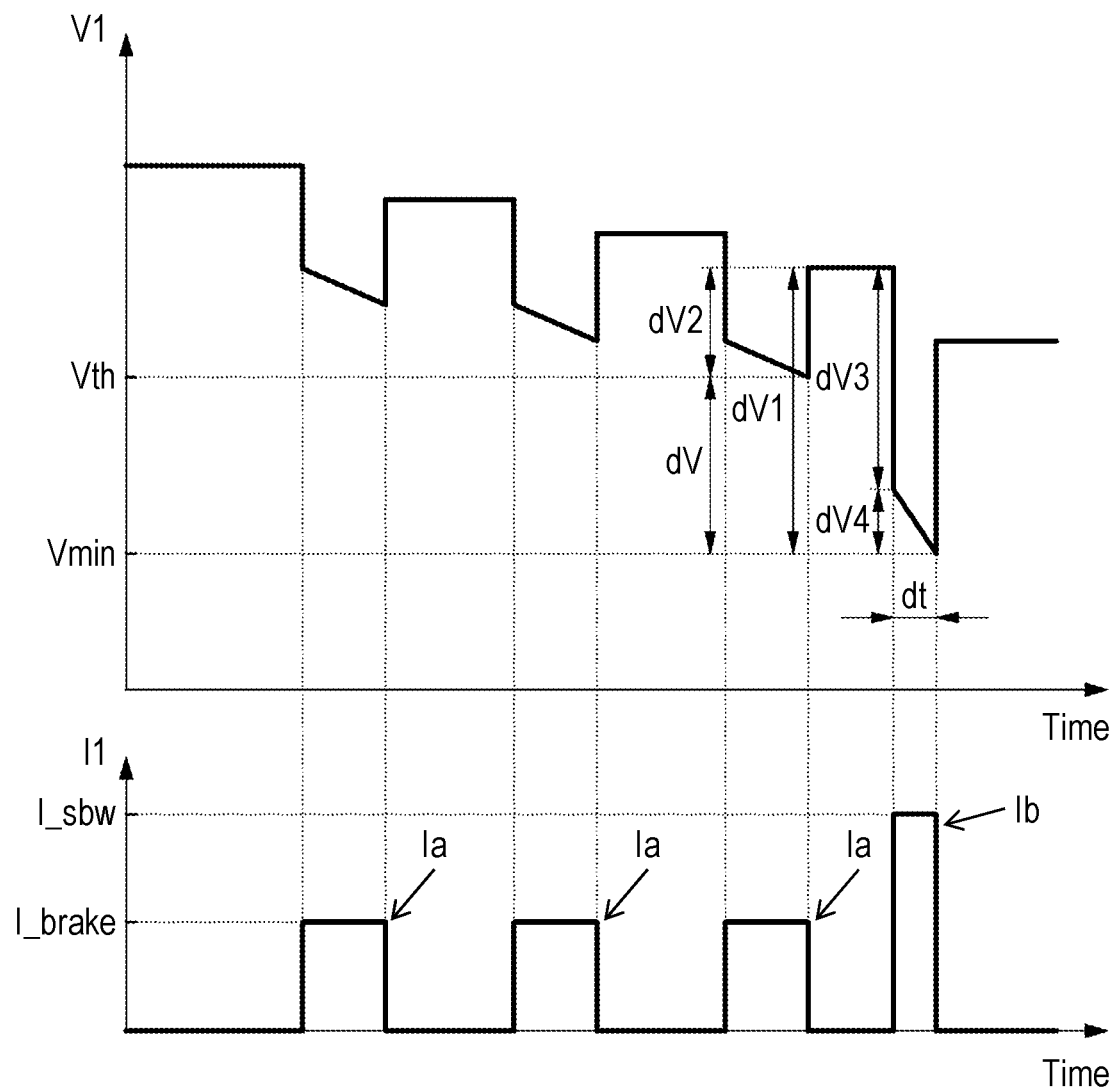
FIG. 3 is a timing chart illustrating a process for determining a threshold voltage.

Next, a method of determining the threshold voltage will be described with reference to FIG. 3. In the description, the model case shown in FIG. 3 is assumed. In the model case of FIG. 3, plural electric apparatuses 5 is two systems: shift-by-wire system 50 and brake system 60. Shift-by-wire system 50 corresponds to particular electric apparatus 5 (particular load) and brake system 60 corresponds to non-particular electric apparatus 5 (non-particular load). In FIG. 3, the upper part shows a timing chart of output voltage V1 of power storage unit 20, and the lower part shows a timing chart of output current I1 of power storage unit 20.

In the model case of FIG. 3, a case is assumed where a driver halts the vehicle by manipulating the brake several times (e.g., three times) (that is, brake system 60 being non-particular electric apparatus 5 operates several times, e.g., three times). After that, the driver shifts the shift lever into the parking range (that is, shift-by-wire system 50 being particular electric apparatus 5 operates once). That is, it is assumed that two systems 50 and 60 do not operate simultaneously.

In this case, every time brake system 60 operates once (that is, every time the brake pedal is subjected to one-time manipulation), current I_brake is supplied from power storage unit 20 to brake system 60. As a result, every time brake system 60 operates once, rectangular current waveform Ia appears in the timing chart of the output current of power storage unit 20. When shift-by-wire system 50 operates once (that is, the shift lever is shifted into the parking range), current I_sbw is supplied from power storage unit 20 to shift-by-wire system 50. As a result, when shift-by-wire system 50 operates once, rectangular current waveform Ib appears in the timing chart of the output current of power storage unit 20.

Note that the rising and falling edges of each current waveform Ia correspond to the start-up and end of the one-time manipulation of the brake pedal, respectively. The rising and falling edges of each current waveform Ib correspond to the start-up and end of the one-time manipulation of shifting the shift lever into the parking range, respectively.

Then, output voltage V1 of power storage unit 20 decreases in accordance with current waveforms Ia and Ib of output current I1 of power storage unit 20. That is, every time the brake pedal is manipulated, output voltage V1 of power storage unit 20 suddenly drops at the start-up of the manipulation, gradually decreases during the manipulation, and returns by a certain voltage at the end of the manipulation. Then, every time the manipulation of the brake pedal, the locally-lowest point of the decreasing voltage during the corresponding manipulation is lowered. When the shift lever is manipulated to shift into the parking range, output voltage V1 of power storage unit 20 suddenly drops upon the manipulation, gradually decreases during the manipulation, and returns by a certain voltage at the end of the manipulation. The voltage-drop amount due to the manipulation of shifting the shift lever into the parking range is larger than the voltage-drop amount due to the one-time manipulation of the brake pedal.

In this model case, the voltage returns at the end of each of the manipulations of the brake pedal and shift lever. In this case, regarding output voltage V1 of power storage unit 20, substantial voltage-drop amount dV per one-time manipulation of the shift lever is equal to a voltage drop obtained as follows: Voltage-return amount dV2 at the end of the manipulation of the brake pedal that is performed immediately before the one-time manipulation of the shift lever is subtracted from voltage-drop amount dV1 of the total one-time manipulation of the shift lever (i.e., dV=dV1−dV2).

Voltage-drop amount dV1 is the sum of voltage-drop amount dV3 and voltage-drop amount dV4. Voltage-drop amount dV3 is the product (I_sbw×R) of current I_sbw at the start-up of manipulation of the shift lever and internal resistance R of power storage unit 20 (i.e., dV3=I_sbw×R). Voltage-drop amount dV4 is given as the value (I_sbw×dt/C) obtained by dividing the change amount (I_sbw×dt) of the electric charge stored in power storage unit 20 during the manipulation of the shift lever by capacitance C of power storage unit 20 (i.e., dV4=I_sbw×dt/C). Note that "dt" denotes the period of time of manipulation of the shift lever. Voltage-return amount dV2 is given as the product (I_brake×R) of current I_brake at the start-up of manipulation of the brake pedal and internal resistance R of power storage unit 20 (i.e., dV2=I_brake×R). Accordingly, voltage-drop amount dV1 is given by the arithmetic expression of Formula 1.

$$dV=(I\_sbw-I\_brake)\times R+I\_sbw\times dt/C \quad \text{Formula 1}$$

This voltage-drop amount dV is the voltage corresponding to the electric energy allowing shift-by-wire system 50 in the model case to operate once.

Threshold voltage Vth in this model case is given as follows: Brake system 60 has been operated multiple times with the locally-lowest points appearing multiple times in the decreasing voltage. After that, shift-by-wire system 50 is operated, which in turn further lowers the voltage to the lowest point equal to a minimum guaranteed voltage Vmin of power storage unit 20 which guarantees the operation of the power storage unit. In such an operation, the lowest points among the locally-lowest points appearing in the multiple-time operations of brake system 60 is determined to be threshold voltage Vth in this model case (that is, Vth=dV+Vmin). Threshold voltage Vth is thus given by the arithmetic expression of Formula 2.

$$V\text{th}=(I\_sbw-I\_brake)\times R+I\_sbw\times dt/C+V\text{min} \quad \text{Formula 2}$$

Threshold voltage Vth is determined based on a voltage difference obtained by subtracting voltage-return amount dV2 of non-particular electric apparatus 5 (brake system 60) from voltage-drop amount dV1 of particular electric apparatus 5 (shift-by-wire system 50). Threshold voltage Vth is determined based on current I_sbw supplied to particular electric apparatus 5, internal resistance R of power storage unit 20, and capacitance C of power storage unit 20.

In the embodiment, each of currents I_sbw and I_brake is initially set. Internal resistance R and capacitance C may be determined to be values measured in backup power-supply system 1. Note that internal resistance R and capacitance C may be initially set as in the case of the values of currents I_sbw and I_brake.

In the embodiment, switch controller 33 calculates threshold voltage Vth based on the arithmetic expression of Formula 2. Either when backup power-supply system 1 is started up or when abnormality detector 31 detects an abnormality in main power supply 4, switch controller 33 calculates threshold voltage Vth based on the arithmetic expression of Formula 2.

Figure 4:
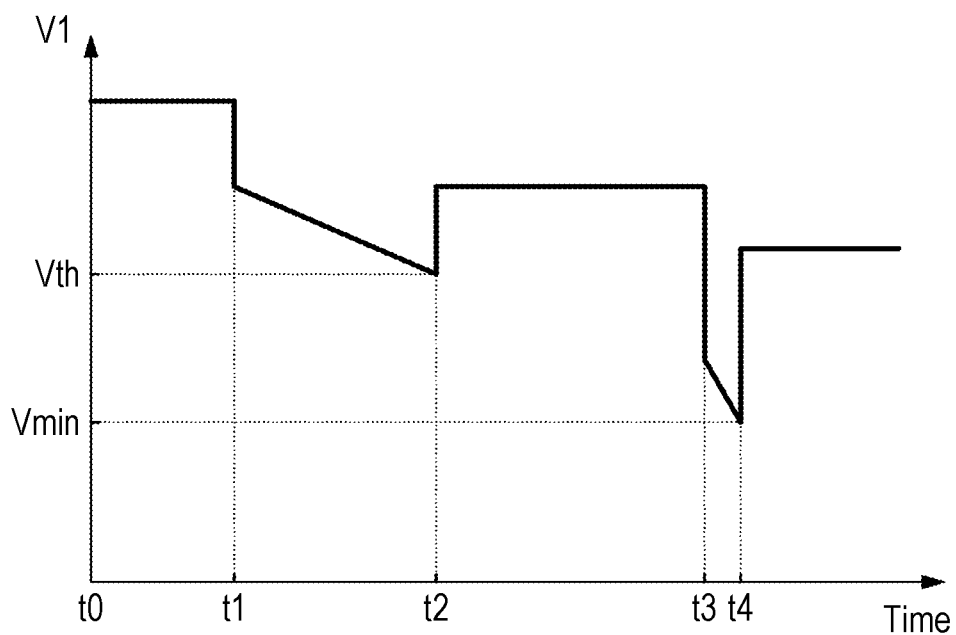
FIG. 4 is an illustrative diagram for explaining an operation of a principal part (switch controller) of a control circuit.

Next, an operation of switch controller 33 will be described with reference to FIG. 4. FIG. 4 illustrates an example of a change of output voltage V1 of power storage unit 20 with respect to time. In the following description, a case is assumed where abnormality detector 31 detects an abnormality in main power supply 4 and where switch controller 33 turns on all the plural switches SW1 and SW2 to supply the output electric power of power storage unit 20 to all the plural electric apparatuses 5. In this case, switch controller 33 monitors output voltage V1 of power storage unit 20 by determining, intermittently at regular intervals, whether or not output voltage V1 of power storage unit 20 becomes lower than threshold voltage Vth.

Brake system 60 operates once between time points t1 to t2. More specifically, brake system 60 starts to operate at time point t1 and the output voltage of power storage unit 20 decreases. Then, brake system 60 ends the operation at time point t2 and the voltage returns. In this example, output voltage V1 of power storage unit 20 becomes lower than threshold voltage Vth at time point t2. That is, the remaining electric energy of power storage unit 20 decreases down to the electric energy allowing particular electric apparatus 5 (i.e., shift-by-wire system 50) to operate at least once. This situation causes switch controller 33 to determine that output voltage V1 becomes lower than threshold voltage Vth. Based on this determination, switch controller 33 performs control to turn on only particular switch SW1 out of the plural switches SW1 and SW2 and turn off other switch SW2. This situation allows the output electric power of power storage unit 20 to be supplied to only particular electric apparatus 5 (shift-by-wire system 50) out of the plural electric apparatuses 5, and is not supplied to the other electric apparatus 5 (brake system 60). That is, only particular electric apparatus 5 is operable while the other electric apparatus 5 is halted. For this reason, even if a driver manipulates the other electric apparatus 5 (brake system 60), the other electric apparatus 5 does not operate.

Then, particular electric apparatus 5 (shift-by-wire system 50) starts to operate at time point t3, and then, the operation ends at time point t4. In this operation, the shift lever is manipulated to lock the movement of the vehicle. When output voltage V1 of power storage unit 20 becomes lower than threshold voltage Vth (that is, when the remaining electric energy of power storage unit 20 becomes smaller than the threshold electric energy), the electric power is supplied preferentially to particular electric apparatus 5

(shift-by-wire system 50) being important electric apparatus 5, thereby ensuring the operation of important electric apparatus 5.

MODIFIED EXAMPLES

Modified examples of the embodiment will be described below. The following modified examples may be implemented in combination.

Modified Example 1

In the embodiment described above, a case is assumed that the remaining electric energy of power storage unit 20 is monitored by monitoring output voltage V1 of power storage unit 20. However, the remaining electric energy of power storage unit 20 may be directly monitored. In this case, when the remaining electric energy becomes smaller than the threshold electric energy, electric apparatuses 5 to which power storage unit 20 supplies electric power may be limited.

Modified Example 2

In the embodiment described above, threshold voltage Vth is determined in consideration of the returning of voltage at the end of operation of brake system 60. Threshold voltage Vth may be determined without consideration of the returning of voltage at the end of operation of brake system 60. Threshold voltage Vth in this case is given by the arithmetic expression of Formula 3.

$$Vth = I\_sbw \times R + I\_sbw \times dt/C + Vmin \qquad \text{Formula 3}$$

The arithmetic expression of Formula 3 is an arithmetic expression in which the contribution of voltage-return amount dV2 in the arithmetic expression of Formula 2 is eliminated. That is, threshold voltage Vth in the present modified example is determined based on voltage-drop amount dV1 of particular electric apparatus 5 (shift-by-wire system 50), without subtracting voltage-return amount dV2 of non-particular electric apparatus 5 (brake system 60).

Figure 5:
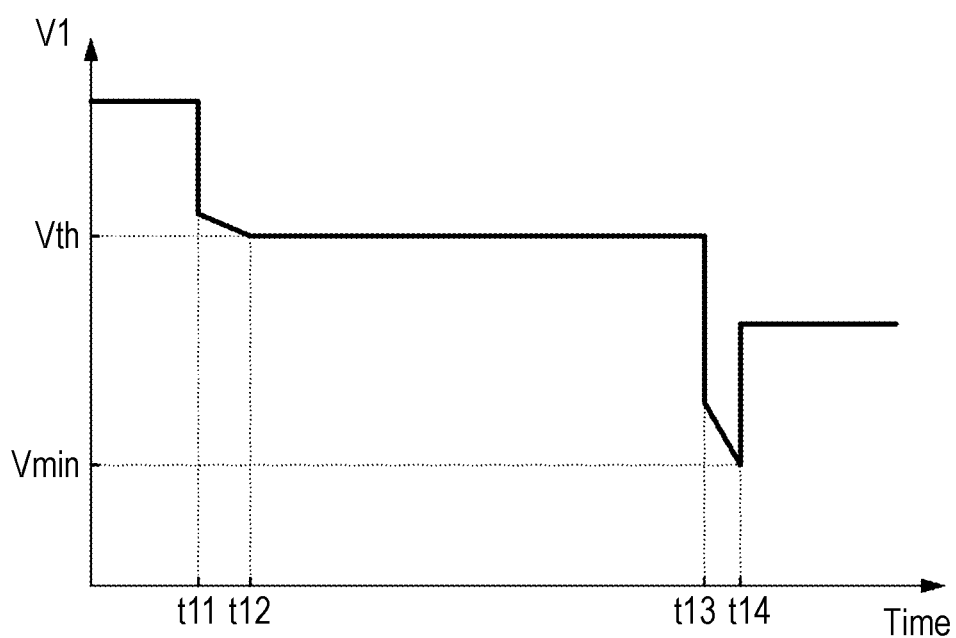
FIG. 5 is an illustrative diagram for explaining an operation of a principal part (switch controller) of a control circuit according to Modified Example 2.

In the modified example, a change in output voltage V1 of power storage unit 20 with respect to time is shown in FIG. 5. That is, brake system 60 operates once between time points t11 to t12. More specifically, brake system 60 starts its operation at time point t11 so that the output voltage of power storage unit 20 decreases. Brake system 60 ends the operation at time point t2. In this case, the voltage does not return at the end of the operation of the brake system. In this example, output voltage V1 of power storage unit 20 becomes lower than threshold voltage Vth at time point t12. In this situation, switch controller 33 determines that output voltage V1 becomes lower than threshold voltage Vth. Based on this determination, switch controller 33 performs control to turn on only particular switch SW1 out of the plural switches SW1 and SW2 and turn off other switch SW2. This configuration allows the output electric power of power storage unit 20 to be supplied to only particular electric apparatus 5 (shift-by-wire system 50) out of the plural electric apparatuses 5 and to be not supplied to the other electric apparatus 5 (brake system 60).

Then, particular electric apparatus 5 (shift-by-wire system 50) starts its operation at time point t13, and ends the operation at time point t14. This operation causes the shift lever to be shifted into the parking range, thereby locking the movement of the vehicle. In the present modified example as well, when output voltage V1 of power storage unit 20 becomes lower than threshold voltage Vth (that is, when the remaining electric energy of power storage unit 20 becomes smaller than the threshold electric energy), the electric power is supplied preferentially to particular electric apparatus 5 (shift-by-wire system 50) being the important electric apparatus, thereby ensuring the operation of particular electric apparatus 5.

Modified Example 3

In the embodiment described above, switch controller 33 possesses only one arithmetic expression (the arithmetic expression of Formula 2) for determining threshold voltage Vth. However, in cases where the number of the plural electric apparatuses 5 is equal to or larger than three, switch controller 33 may possess plural arithmetic expressions for determining threshold voltage Vth. In this case, in accordance with a change in output voltage V1 of power storage unit 20, switch controller 33 selects one arithmetic expression from the plural arithmetic expressions, and then, sets threshold voltage Vth based on the selected arithmetic expression.

More specifically, the number of the plurality of electric apparatuses 5 is equal to or larger than three provides plural non-particular electric apparatuses 5. Both the voltage-drop amount (i.e., behavior of the voltage drop) at the start-up of operation and the voltage-return amount (i.e., behavior of the voltage return) at the end of operation depend on non-particular electric apparatuses 5. For this reason, an arithmetic expression for determining threshold voltage Vth is prepared for each of non-particular electric apparatuses 5. That is, switch controller 33 possess plural arithmetic expressions for determining threshold voltage Vth. Then, in accordance with the behavior of either the drop or return of output voltage V1 of power storage unit 20, the controller determines which one of non-particular electric apparatuses 5 currently operates, then threshold voltages Vth are set based on an arithmetic expression corresponding to thus-determined non-particular electric apparatus 5. This configuration allows the setting of optimal threshold voltage Vth in accordance with non-particular electric apparatuses 5 currently operating.

Modified Example 4

In the embodiment described above, the arithmetic expression (Formula 2) for determining threshold voltage Vth is assumed to hold in the case where the operations of two systems 50 and 60 do not operate simultaneously; however, the arithmetic expression may be assumed to hold in the case where the operations of two systems 50 and 60 operate simultaneously. Threshold voltage Vth in this case is given by the arithmetic expression of Formula 4.

$$Vth = (I\_sbw + I\_brake) \times R + (I\_sbw + I\_brake) \times dt/C + Vmin \qquad \text{Formula 4}$$

Summary

A backup power-supply system (1) according to a first aspect includes a detector (31), a power storage unit (20), and a controller (33). The detector (31) is configured to detect an abnormality in a power supply (4) configured to supply electric power to plural loads (5). The power storage unit (20) is configured to supply electric power to the plural loads (5) when the detector (31) detects abnormality in the power supply (4). The controller (33) is configured to monitor a remaining electric energy of the power storage unit (20), and to impose, when the remaining electric energy of the power storage unit (20) is smaller than a threshold electric energy, a limitation on the loads (5) to which the power storage unit (20) supplies the electric power.

In this configuration, when the remaining electric energy of the power storage unit (20) is smaller than the threshold electric energy, the power storage unit (20) imposes the limitation on the loads (5) to which the power storage unit (20) supplies the electric power. Therefore, the electric power is supplied preferentially to an important load (5) even when the remaining electric energy of the power storage unit (20) becomes small.

A backup power-supply system (1) according to a second aspect is the backup power-supply system according to the first aspect in which the controller (33) supplies the electric power from the power storage unit (20) to the plural loads (5) from a time when the detector (31) detects the abnormality in the power supply (4) until the remaining electric energy of the power storage unit (20) becomes smaller than the threshold electric energy.

This configuration reduces a decrease in degree of freedom of operation of the load (5) from a time when the detector (31) detects the abnormality in the power supply (4) until the remaining electric energy of the power storage unit (20) becomes smaller than the threshold electric energy (in particular, immediately after the detection).

A backup power-supply system (1) according to a third aspect is the backup power-supply system according to the first or the second aspect in which the power storage unit (20) outputs an output voltage (V1) with a value corresponding to the threshold electric energy. The value is set as a threshold voltage (Vth). In this case, the controller (33) monitors the remaining electric energy of the power storage unit (20) by monitoring the output voltage (V1) of the power storage unit (20). When the output voltage (V1) of the power storage unit (20) becomes lower than the threshold voltage (Vth), the controller determines that the remaining electric energy of the power storage unit (20) becomes smaller than the threshold electric energy.

In this configuration, since the remaining electric energy of the power storage unit (20) is monitored by monitoring the output voltage (V1) of the power storage unit (20). This eliminates the need for an expensive sensor, such as a current sensor. The monitoring of the remaining electric energy of the power storage unit (20) may be made by a low-cost configuration.

A backup power-supply system (1) according to a fourth aspect is the backup power-supply system according to the third aspect in which, when the remaining electric energy of the power storage unit (20) is smaller than the threshold electric energy, the controller (33) may allow the electric power from the power storage unit (20) to be supplied only to a particular load (e.g., shift-by-wire system 50) out of the plural loads (5).

This configuration ensures the supplying of electric power to the particular load (50) of the plurality of loads (5) when the remaining electric energy of the power storage unit (20) is smaller than the threshold electric energy.

A backup power-supply system (1) according to a fifth aspect is the backup power-supply system according to the fourth aspect in which the threshold electric energy is an electric energy allowing the particular load (50) to operable at least once.

This configuration ensures the electric energy with which the particular load (50) is operable at least once even when the remaining electric energy of the power storage unit (20) is smaller than the threshold electric energy.

A backup power-supply system (1) according to a sixth aspect is the backup power-supply system according to the fourth or the fifth aspect in which a load (60) out of the plural loads (5) other than the particular load (50) is set as a non-particular load. An amount of a drop in the output voltage (V1) of the power storage unit (20) at a start-up of an operation of the particular load (50) is set as a voltage-drop amount (dV1). An amount of a return in the output voltage (V1) of the power storage unit (20) at an end of an operation of the non-particular load (60) is set as a voltage-return amount (dV2). The threshold voltage (Vth) is determined based on a voltage difference obtained by subtracting the voltage-return amount (dV2) for the non-particular load (60) from the voltage-drop amount (dV1) for the particular load (50).

In this configuration, the threshold voltage (Vth) is determined in consideration of the voltage-return amount (dV2) that occurs at the end of the operation of the non-particular load (60), allowing the threshold voltage (Vth) to be determined accurately. That is, the threshold voltage (Vth) may be determined to be the lowest possible value.

A backup power-supply system (1) according to a seventh aspect is the backup power-supply system according to the fourth or the fifth aspect in which a load (60) out of the plurality of loads (5) other than the particular load (50) is defined as a non-particular load. An amount of a drop in the output voltage (V1) of the power storage unit (20) at a start-up of an operation of the particular load (50) is defined as a voltage-drop amount (dV1). An amount of a return in the output voltage (V1) of the power storage unit (20) at an end of an operation of the non-particular load (60) is defined as a voltage-return amount (dV2). The threshold voltage (Vth) is set based on the voltage-drop amount (dV1) for the particular load (50) without subtracting the voltage-return amount (dV2) for the non-particular load (60) from the voltage-drop amount (dV1).

In this configuration, since the threshold voltage (Vth) is set without consideration of the voltage-return amount (dV2) that occurs at the end of the operation of the non-particular load (60), the threshold voltage (Vth) is obtained by simple arithmetic.

A backup power-supply system (1) according to an eighth aspect is the backup power-supply system according to any one of the fourth to the seventh aspect in which the threshold voltage (Vth) is determined based on a value of an electric current (I_sbw) supplied to the particular load (50), an internal resistance (R) of the power storage unit (20), and a capacitance (C) of the power storage unit (20).

In this configuration, the threshold voltage (Vth) can be determined based on the value of the electric current (I_sbw) supplied to the particular load (50), the internal resistance (R) of the power storage unit (20), and the capacitance (C) of the power storage unit (20).

A backup power-supply system (1) according to a ninth aspect is the backup power-supply system according to any one of the fourth to the eighth aspect in which the controller (33) may possess plural arithmetic expressions for calculating the threshold voltage (Vth). The controller (33) selects one arithmetic expression from the plural arithmetic expressions in accordance with a change in the output voltage (V1) of the power storage unit (20), and determine the threshold voltage (Vth) based on the selected arithmetic expression.

In this configuration, the threshold voltage (Vth) can be set in accordance with a change in the output voltage (V1) of the power storage unit (20).

A backup power-supply system (1) according to a tenth aspect is the backup power-supply system according to any one of the three to the ninth aspect in which the threshold voltage (Vth) may be initially set.

This configuration reduces a processing load of computing the threshold voltage (Vth).

A backup power-supply system (1) according to an eleventh aspect is the backup power-supply system according to any one of the first to the tenth aspect. The backup power-supply system may further include a notification unit (24) configured to notify a user of a content of the limitation when the controller (33) imposes the limitation on the loads to which the power storage unit (20) supplies the electric power.

This configuration notifies the user of the content of the limitation.

A backup power-supply system (1) according to a twelfth aspect is the backup power-supply system according to any one of the first to the eleventh aspect. The backup power-supply system may further include a transformation circuit (21) configured to raise the output voltage (V1) of the power storage unit (20) and to output the raised output voltage to the plurality of loads (5).

This configuration may raise the output voltage (V1) of the power storage unit (20) and to supply the raised output voltage to the loads (5).

A backup power-supply system (1) according to a thirteenth aspect is the backup power-supply system according to any one of the first to the twelfth aspect in which the power supply (4) and the plural loads (5) are mounted on a vehicle body.

In this configuration, the backup power-supply system (1) is applicable to a vehicle.

A vehicle according to a fourteenth aspect includes a backup power-supply system (1) according to any one of the first to the thirteenth aspect, and a body of the vehicle, the backup power-supply system (1) being mounted on the body.

This configuration provides a vehicle on which the backup power-supply system (1) offering the advantageous effects described above is mounted.

REFERENCE MARKS IN THE DRAWINGS 1 backup power-supply system
5 electric apparatus (load)
20 power storage unit
21 charging-discharging circuit (transformation circuit)
24 notification unit
31 abnormality detector (detector)
33 switch controller (controller)
50 shift-by-wire system (particular load)
60 brake system (non-particular load)
dV1 voltage-drop amount
dV2 voltage-return amount
C capacitance
R resistance
V1 output voltage
Vth threshold voltage

The invention claimed is:

1. A backup power-supply system comprising:
a detector configured to detect an abnormality of a power supply configured to supply electric power to a plurality of loads;
a power storage unit configured to supply electric power to the plurality of loads when the detector detects the abnormality of the power supply; and
a controller configured to
monitor a remaining electric energy remaining in the power storage unit, and
when the remaining electric energy of the power storage unit is smaller than a threshold electric energy, impose a limitation on the plurality of loads to which the power storage unit supplies the electric power.

2. The backup power-supply system according to claim 1, wherein the controller is configured to cause the power storage unit to supply electric power to the plurality of loads from a time when the detector detects the abnormality of the power supply until the remaining electric energy of the power storage unit becomes smaller than the threshold electric energy.

3. The backup power-supply system according to claim 1, wherein
a threshold voltage is defined as a value of an output voltage of the power storage unit corresponding to the threshold electric energy,
the controller is configured to:
monitor the remaining electric energy of the power storage unit by monitoring the output voltage of the power storage unit, and
determine that the remaining electric energy of the power storage unit becomes smaller than the threshold electric energy when the output voltage of the power storage unit becomes lower than the threshold voltage.

4. The backup power-supply system according to claim 3, wherein the controller is configure to cause the power storage unit to supply the electric power only to a particular load out of the plurality of loads when the remaining electric energy of the power storage unit is smaller than the threshold electric energy.

5. The backup power-supply system according to claim 4, wherein the threshold electric energy is an electric energy allowing the particular load to operate at least once.

6. The backup power-supply system according to claim 4, wherein
a load out of the plurality of loads other than the particular load is defined as a non-particular load,
an amount of a drop of the output voltage at a start-up of an operation of the particular load is defined a voltage-drop amount,
an amount of a return of the output voltage of the power storage unit at an end of an operation of the non-particular load is defined as a voltage-return amount, and
the threshold voltage is determined based on a voltage difference obtained by subtracting the voltage-return amount for the non-particular load from the voltage-drop amount for the particular load.

7. The backup power-supply system according to claim 4, wherein,
a load out of the plurality of loads other than the particular load is defined as a non-particular load,
an amount of a drop of the output voltage of the power storage unit at a start-up of an operation of the particular load is defined as a voltage-drop amount,
an amount of a return of the output voltage of the power storage unit at an end of an operation of the non-particular load is defined as a voltage-return amount, and
the threshold voltage is determined based on the voltage-drop amount for the particular load without subtracting the voltage-return amount for the non-particular load from the voltage-drop amount.

8. The backup power-supply system according to claim 4, wherein, the threshold voltage is determined based on a value of an electric current supplied to the particular load, an internal resistance of the power storage unit, and a capacitance of the power storage unit.

9. The backup power-supply system according to claim 4, wherein
the controller is configured to:
possess a plurality of arithmetic expressions for calculating the threshold voltage;
select one arithmetic expression from the plurality of arithmetic expressions in accordance with a change of the output voltage of the power storage unit; and
determine the threshold voltage with the selected one arithmetic expression.

10. The backup power-supply system according to claim 3, wherein the threshold voltage is initially set.

11. The backup power-supply system according to claim 1, further comprising a notification unit configured to notify a user of a content of the limitation when the controller imposes the limitation on the plurality of loads to which the power storage unit supplies the electric power.

12. The backup power-supply system according to claim 1, further comprising a transformation circuit configured to raise the output voltage of the power storage unit and to output the raised output voltage to the plurality of loads.

13. The backup power-supply system according to claim 1, wherein the power supply and the plurality of loads are configured to be mounted on a vehicle body.

14. A vehicle comprising:
the backup power-supply system according to claim 1; and
a vehicle body having the backup power-supply system mounted thereon.

* * * * *